(12) United States Patent
Hayakawa et al.

(10) Patent No.: US 7,669,826 B2
(45) Date of Patent: Mar. 2, 2010

(54) SEAT SLIDING APPARATUS FOR VEHICLE

(75) Inventors: Masatoshi Hayakawa, Toyota (JP);
Yasuhiro Kojima, Kariya (JP);
Yukifumi Yamada, Toyota (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 698 days.

(21) Appl. No.: 11/608,982

(22) Filed: Dec. 11, 2006

(65) Prior Publication Data
US 2007/0158987 A1    Jul. 12, 2007

(30) Foreign Application Priority Data
Dec. 28, 2005 (JP) ............... 2005-380041

(51) Int. Cl.
*F16M 13/00*    (2006.01)
(52) U.S. Cl. ............... 248/430; 248/429; 297/344.1
(58) Field of Classification Search ............... 248/419, 248/420, 424, 429, 430, 298.1; 297/344.1
See application file for complete search history.

(56) References Cited

U.S. PATENT DOCUMENTS

| | | | | |
|---|---|---|---|---|
| 2,014,553 A | * | 9/1935 | Browne | 248/430 |
| 2,534,350 A | * | 12/1950 | Gussack | 384/18 |
| 2,606,090 A | * | 8/1952 | Straubel | 312/334.11 |
| 2,865,684 A | * | 12/1958 | Hahner et al. | 384/17 |
| 3,013,849 A | * | 12/1961 | Tanner | 384/18 |
| 3,186,772 A | * | 6/1965 | Cohn | 384/18 |
| 4,018,488 A | * | 4/1977 | Manson | 384/18 |
| 4,556,263 A | * | 12/1985 | Chevalier | 384/47 |
| 4,811,925 A | * | 3/1989 | Fujita et al. | 248/430 |
| 5,209,447 A | * | 5/1993 | Yokota | 248/429 |
| 5,222,814 A | * | 6/1993 | Boelryk | 384/47 |
| 6,478,280 B2 | * | 11/2002 | Saitoh | 248/429 |
| 6,676,099 B2 | * | 1/2004 | Mallard et al. | 248/429 |

FOREIGN PATENT DOCUMENTS

JP    58126227 A  *  7/1983
JP    2005-47347      2/2005

* cited by examiner

*Primary Examiner*—Kimberly T Wood
(74) *Attorney, Agent, or Firm*—Oblon, Spivak, McClelland, Maier & Neustadt, L.L.P.

(57) ABSTRACT

A seat sliding apparatus for a vehicle includes a lower rail fixed to a vehicle floor, an upper rail fixed to a vehicle seat, rolling engagement members disposed between the lower rail and the upper rail for making the upper rail to be movable relative to the lower rail in a longitudinal direction thereof, and two retainers arranged between the lower rail and the upper rail along a longitudinal direction thereof and each including a notch. The rolling engagement members are rotatably held at a front end portion and a rear end portion of the retainer. In addition, the lower rail includes a first engagement projection engaging with front end and rear end surfaces of the notch in response to a sliding movement of the upper rail relative to the lower rail.

6 Claims, 7 Drawing Sheets

SEAT SLIDING APPARATUS FOR VEHICLE

CROSS REFERENCE TO RELATED APPLICATIONS

This application is based on and claims priority under 35 U.S.C. § 119 to Japanese Patent Application No. 2005-380041, filed on Dec. 28, 2005, the entire content of which is incorporated herein by reference.

FIELD OF THE INVENTION

This invention generally relates to a seat sliding apparatus for a vehicle.

BACKGROUND

Figure 9:
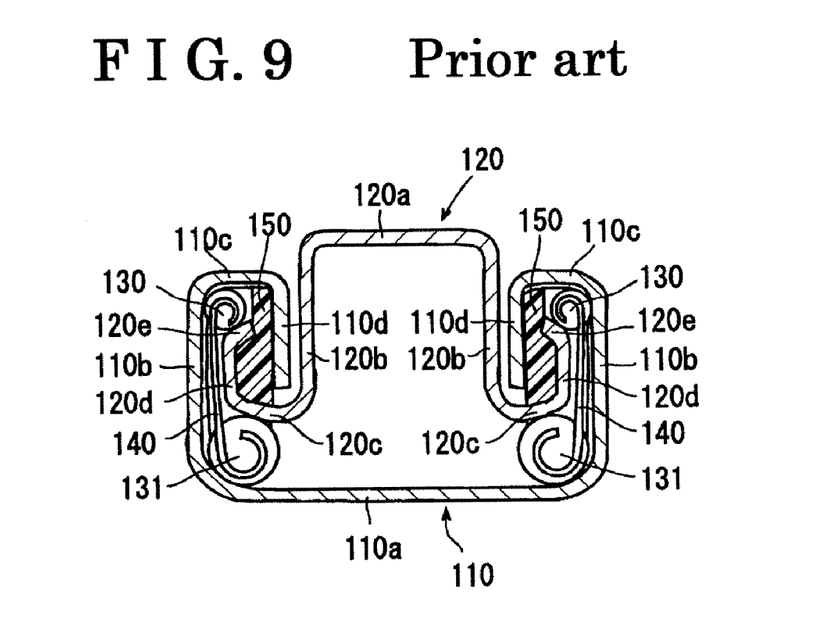
FIG. 9 is a cross-sectional view of a pair of a lower rail and an upper rail according to a conventional seat sliding apparatus for a vehicle.
Figure 10:
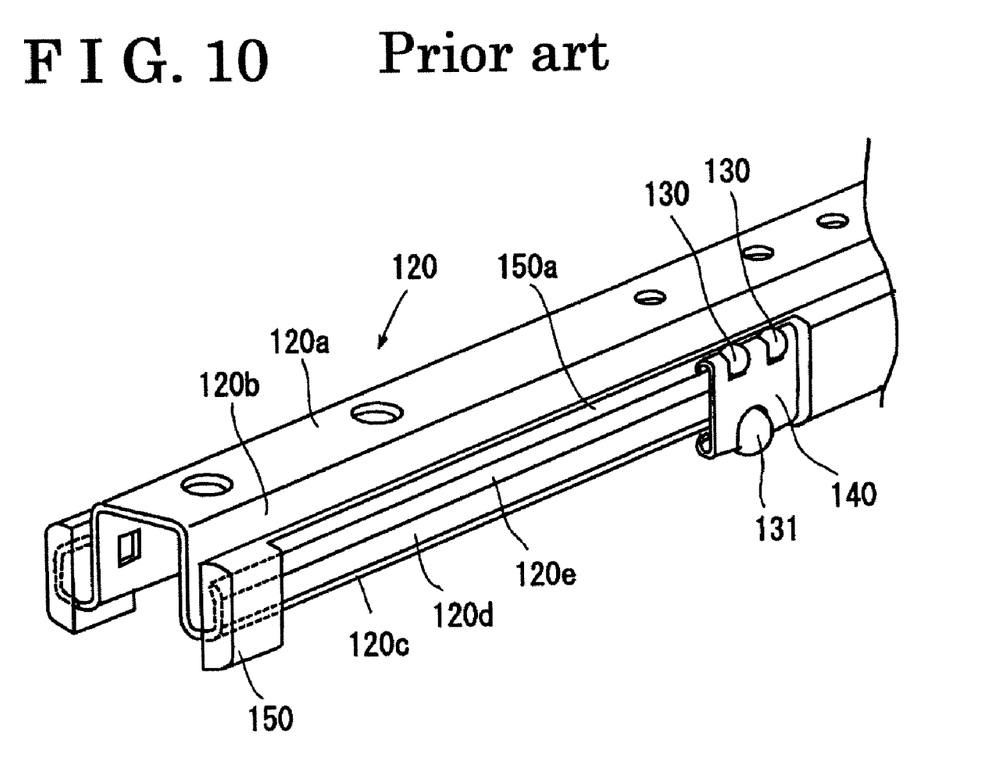
FIG. 10 is a partially enlarged perspective view of the upper rail according to the conventional seat sliding apparatus for a vehicle.

Conventionally, there has been known a seat sliding apparatus for a vehicle disclosed in JP2005-47347A. This seat sliding apparatus for a vehicle includes, as shown in FIGS. 9 and 10, a lower rail 110 fixed on each side in a width direction of a vehicle floor, an upper rail 120 fixed on each side in the width direction of a seat of the vehicle, and steel balls 130 and 131 disposed between the lower rail 110 and the upper rail 120 to enable the upper rail 120 to be movable relative to the lower rail 110 in frontward and rearward directions in a longitudinal direction of the lower rail 110. FIG. 9 is a cross-sectional view of a pair of the lower rail 110 and the upper rail 120 arranged on either one side in the vehicle width direction, and FIG. 10 is a perspective view of the upper rail 120.

As shown in FIG. 9, the lower rail 110 having a substantially U-shape in cross section includes a base bottom portion 110a horizontal to the vehicle floor, first side portions 110b extending upward from the opposite ends of the base bottom portion 110a, upper portions 110c extending inward from respective upper ends of the first side portions 110b, and second side portions 110d extending downward from respective one ends located at an inner side of the upper portions 110c. The upper rail 120 having a substantially reversed U-shape in cross section includes a base plate portion 120a substantially parallel to the base bottom portion 110a of the lower rail 110, vertical portions 120b extending downward from the opposite ends of the base plate portion 120a, connection portions 120c extending outward from respective lower ends of the vertical portions 120b, upright portions 120d extending upward from respective one ends located at an outer side of the connection portions 120c, and tilting portions 120e tilting inward from respective upper ends of the upright portions 120d. Each steel ball 130 is provided in contact with the first side portion 110b and the upper portion 110c of the lower rail 110 and the tilting portion 120e of the upper rail 120. Each steel ball 131 is provided in contact with the base bottom portion 110a and the first side portion 110b of the lower rail 110 and the connection portion 120c of the upper rail 120. These steel balls 130 and 131 are held rotatably by retainers 140. Further, as is also shown in FIG. 10, the upper rail 120 is integrally formed with guides 150 made of resin and each inserted between each first side portion 110b and each second side portion 110d of the lower rail 110. Between the front end portion and the rear end portion of each guide 150, a recess portion 150a is formed into a recessed shape and along which the retainer 140 is movable.

According to the seat sliding apparatus for a vehicle described above, the guide 150 inserted between the first side portion 110b and the second side portion 110d of the lower rail 110 is integrally formed with the upper rail 120. Thus, the upper rail 120 can be prevented from deforming. Further, since the movement of the retainer 140 is restricted within the recess portion 150a, the balls 130 and 131 can be prevented from slipping out of the upper rail 120.

However, in the conventional seat sliding apparatus for a vehicle described above, two guides 150 and four retainers 140 are required for one pair of the lower rail 110 and the upper rail 120. This results in increased number of parts. Further, in this seat sliding apparatus for a vehicle, although the balls 130 and 131 are prevented from slipping out of the upper rail 120, no countermeasures have been taken to prevent the balls 130 and 131 from slipping out of the lower rail 110. Thus, in order to prevent the balls 130 and 131 from slipping out of the lower rail 110, it is required to provide eight stoppers in total (two stoppers for each retainer 140) at the lower rail 110 for one pair of the lower rail 110 and the upper rail 120 after assembly, which may cause a post-process to be difficult.

The present invention has been made in view of the drawbacks described above and thus a need exists for a seat sliding apparatus for a vehicle having a reduced number of parts and providing an easier post-process.

SUMMARY OF THE INVENTION

According to an aspect of the present invention, a seat sliding apparatus for a vehicle includes a lower rail fixed to a vehicle floor, an upper rail fixed to a vehicle seat, rolling engagement members disposed between the lower rail and the upper rail for making the upper rail to be movable relative to the lower rail in a longitudinal direction thereof, and two retainers arranged between the lower rail and the upper rail along a longitudinal direction thereof and each including a notch. The rolling engagement members are rotatably held at a front end portion and a rear end portion of the retainer. In addition, the lower rail includes a first engagement projection engaging with front end and rear end surfaces of the notch in response to a sliding movement of the upper rail relative to the lower rail.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
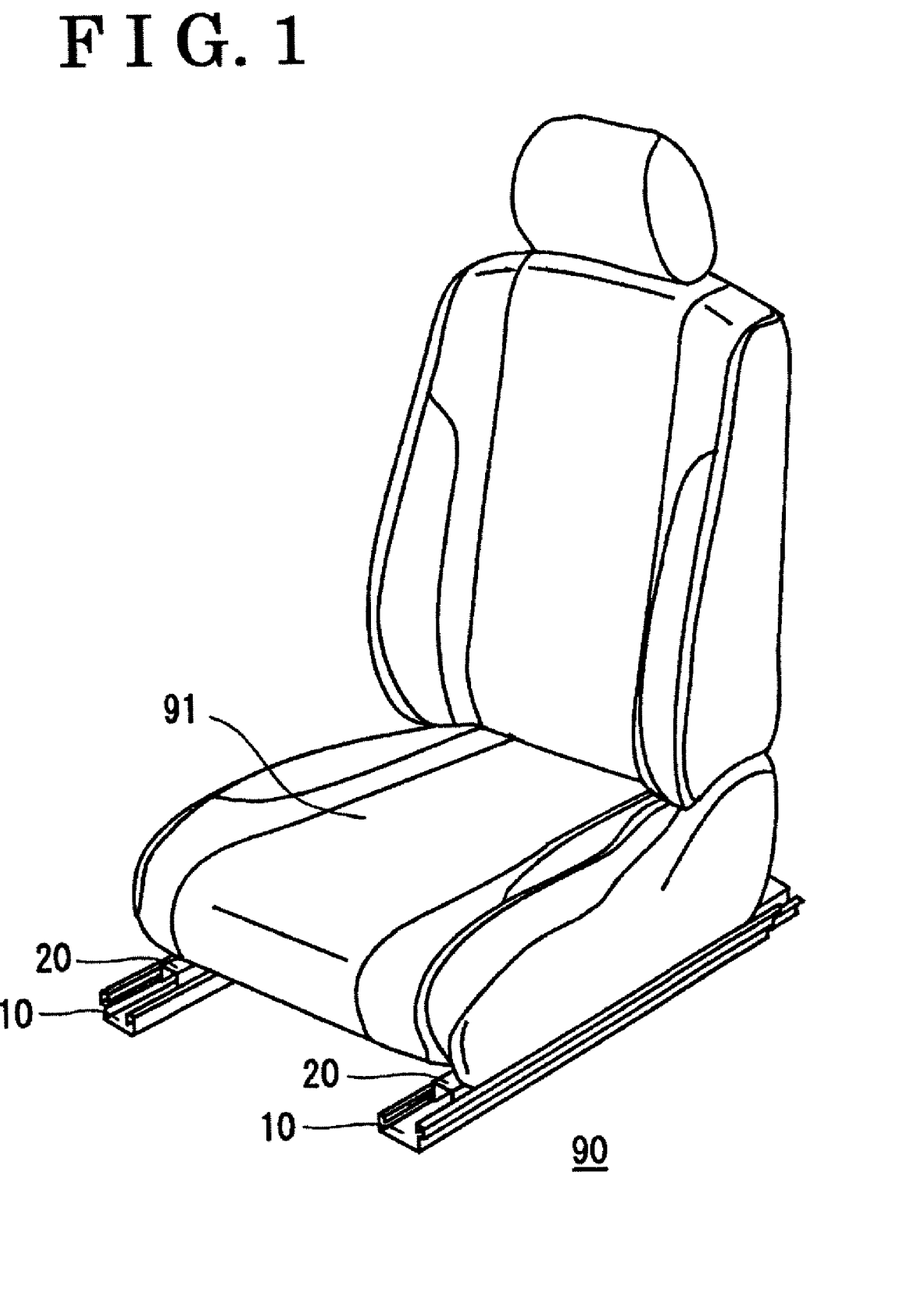
FIG. 1 is a perspective view of a seat sliding apparatus for a vehicle according to an embodiment of the present invention.
Figure 5:
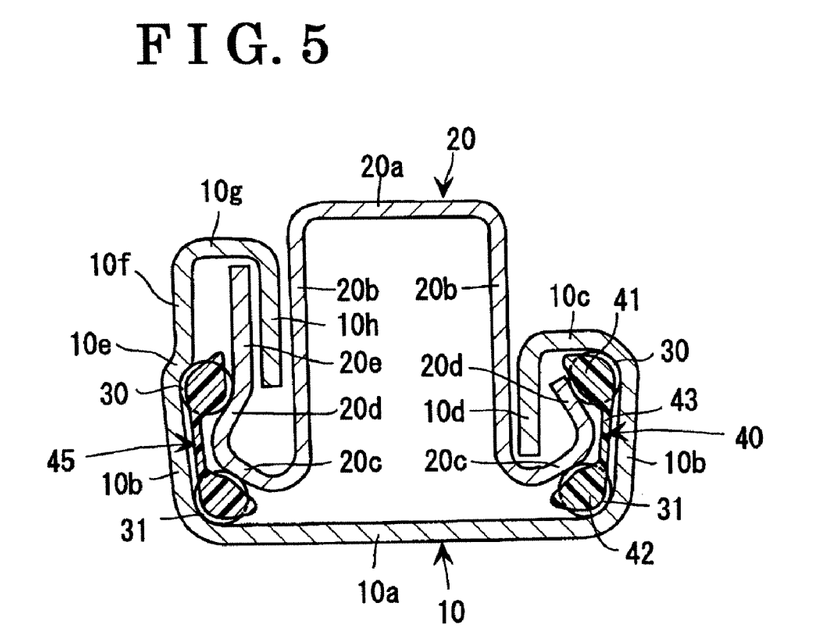
FIG. 5 is a cross-sectional view taken along an arrow V-V of FIG. 2 according to the embodiment of the present invention.

Hereinafter, an embodiment of a seat sliding apparatus for a vehicle will now be described with reference to the drawings. As shown in FIG. 1, the seat sliding apparatus for a vehicle includes two lower rails 10 fixed on opposite sides in a width direction of a vehicle floor 90 along frontward and rearward directions, and two upper rails 20 fixed on opposite sides in the width direction of a vehicle seat 91. As shown in FIG. 5, two retainers 40 and 45 made of resin are provided between one pair of the lower rail 10 and the upper rail 20. Since the retainers 40 and 45 are substantially in the identical shape, the retainer 40 will mainly be described in the following description.

Figure 2:
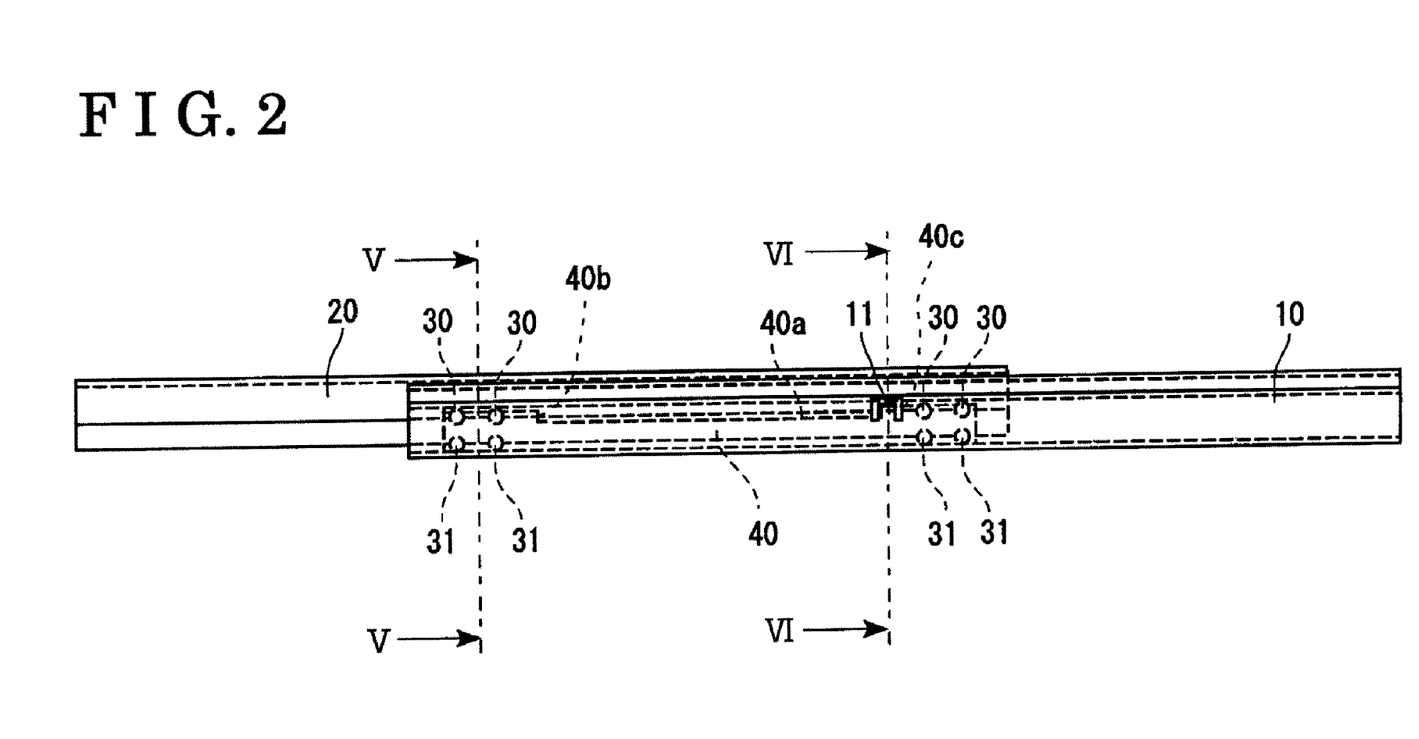
FIG. 2 is a view illustrating a pair of a lower rail and an upper rail in an assembled state according to the embodiment of the present invention.
Figure 3:
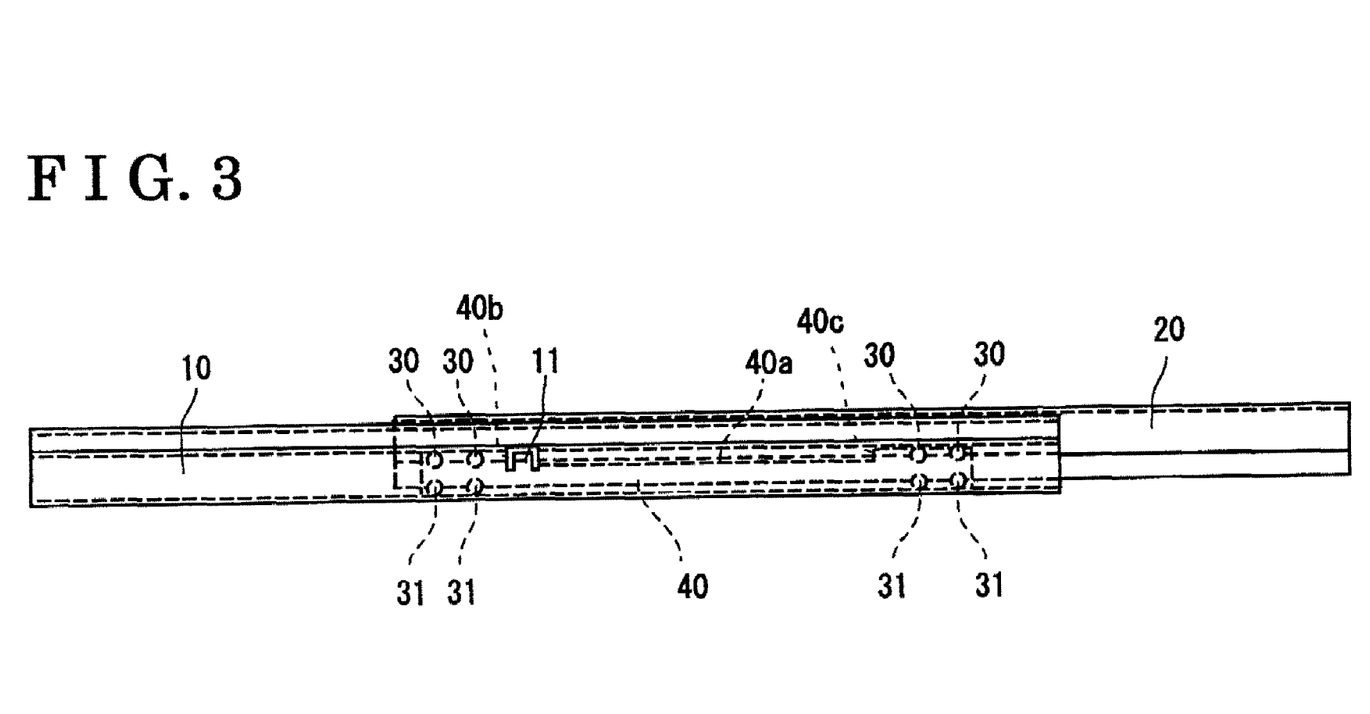
FIG. 3 is a view illustrating the pair of the lower rail and the upper rail in the assembled state according to the embodiment of the present invention.
Figure 4:
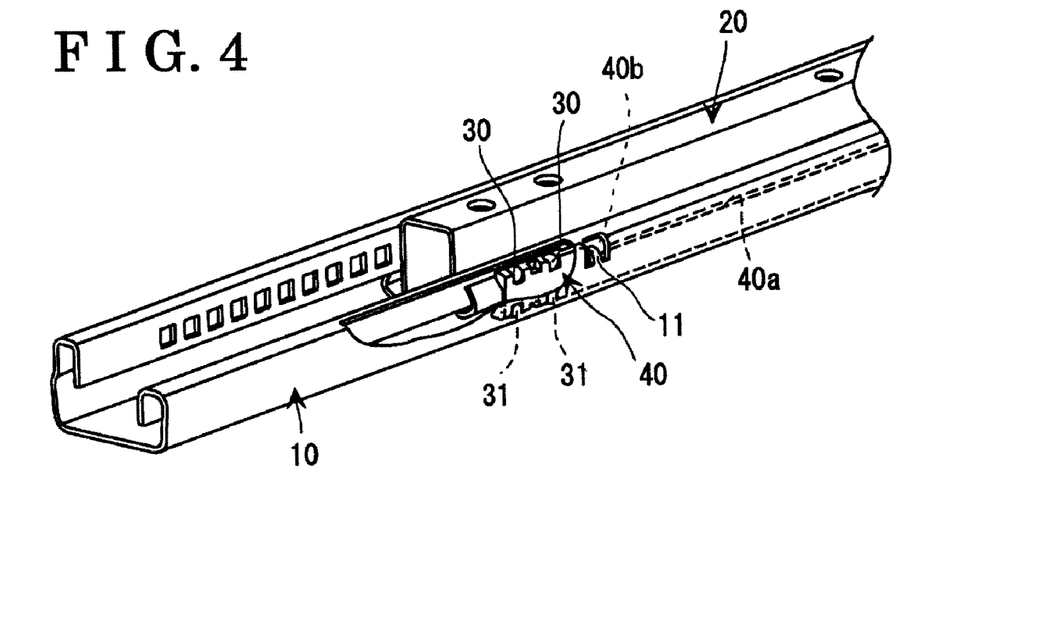
FIG. 4 is a perspective view illustrating the pair of the lower rail and the upper rail according to the embodiment of the present invention.

As shown in FIG. 2, multiple balls 30 and 31 serving as rolling engagement members are rotatably held at a front end portion and a rear end portion of the retainer 40. The balls 30 and 31 render the upper rail 20 movable relative to the lower rail 10 in the frontward and rearward directions. Further, the retainer 40 is formed with a notch 40a. The lower rail 10 is formed with a stopper 11 serving as a first engagement projection for engaging with opposite end surfaces (i.e. front end and rear end surfaces) 40b and 40c in the frontward and rearward directions of the notch 40a and for preventing the retainer 40 from projecting from the lower rail 10 in the frontward and rearward directions. FIG. 2 is a view illustrating a state where the upper rail 20 has moved to the foremost position relative to the lower rail 10. At this time, the rear end surface 40c of the notch 40a is in engagement with the stopper 11. FIG. 3 is a view illustrating a state where the upper rail 20 has moved to the rearmost position relative to the lower rail 10. At this time, the front end surface 40b of the notch 40a is in engagement with the stopper 11. FIG. 4 is a partially enlarged perspective view including the front end portion of the retainer 40 in cases where the upper rail 20 has moved to the rearmost position relative to the lower rail 10.

Figure 6:
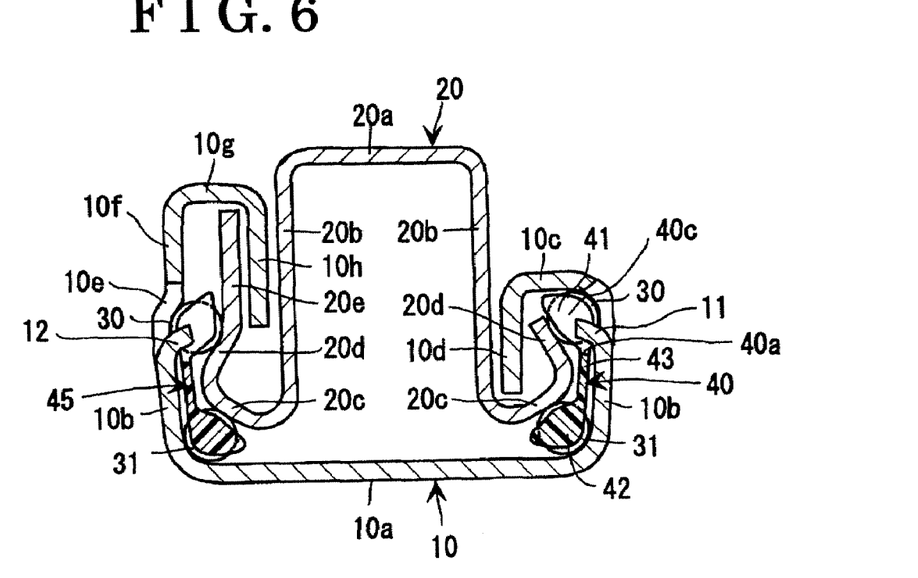
FIG. 6 is a cross-sectional view taken along an arrow VI-VI of FIG. 2 according to the embodiment of the present invention.

Next, a structure of one pair of the lower rail 10 and the upper rail 20 will now be described in detail with reference to FIGS. 5 and 6. FIG. 5 is a cross-sectional view taken along the arrow V-V of FIG. 2, and FIG. 6 is a cross-sectional view taken along the arrow VI-VI of FIG. 2. The lower rail 10 having a substantially U-shape in cross-section as shown in FIG. 5 includes a base bottom portion 10a horizontal to the floor of a vehicle, and first side portions 10b extending upward from opposite ends of the base bottom portion 10a. A first upper portion 10c extends inward from the upper end of one of the first side portions 10b (on the right side in FIG. 5). Then, a second side portion 10d extends downward from one end located at an inner side of the first upper portion 10c. A bending portion 10e extends obliquely inward and upward from the upper end of the other one of the first side portions 10b (on the left side in FIG. 5). A third side portion 10f extends upward from the upper end of the bending portion 10e. A second upper portion 10g extends inward from the upper end of the third side portion 10f. A fourth side portion 10h extends downward from one end located at an inner side of the second upper portion 10g.

The upper rail 20 having a substantially reversed U-shape in cross section includes a base plate portion 20a substantially parallel to the base bottom portion 10a of the lower rail 10, vertical portions 20b extending downward from opposite ends of the base plate portion 20a, connection portions 20c extending obliquely outward and upward from respective lower ends of the vertical portions 20b, and tilting portions 20d extending obliquely inward and upward from respective upper ends of the connection portions 20c. An upright portion 20e extends upward from the upper end of one of the tilting portions 20d (on the left side in FIG. 5).

The ball 30 (on the right side in FIG. 5) is provided in contact with the first side portion 10b and the first upper portion 10c of the lower rail 10, and in contact with the tilting portion 20d of the upper rail 20. The ball 30 (on the left side in FIG. 5) is provided in contact with the bending portion 10e of the lower rail 10, and in contact with the tilting portion 20d and the upright portion 20e of the upper rail 20. Further, the balls 31 (on the left and right sides in FIG. 5) are provided in contact with the base bottom portion 10a and the respective first side portions 10b of the lower rail 10 and the respective connection portions 20c of the upper rail 20. These balls 30 and 31 are rotatably held by the retainers 40 and 45.

Figure 7:
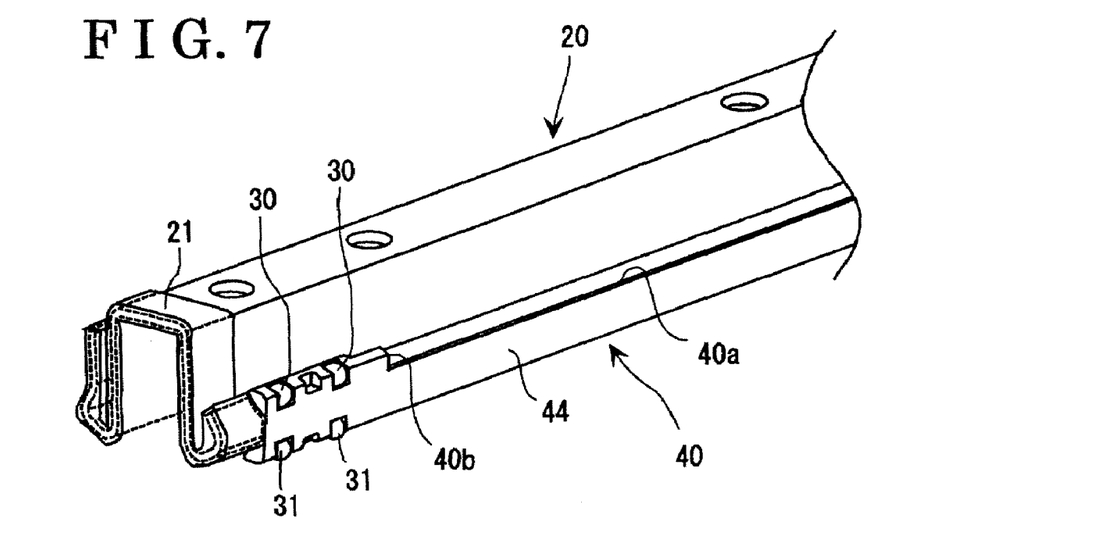
FIG. 7 is a partially enlarged perspective view of the upper rail according to the embodiment of the present invention.
Figure 8:
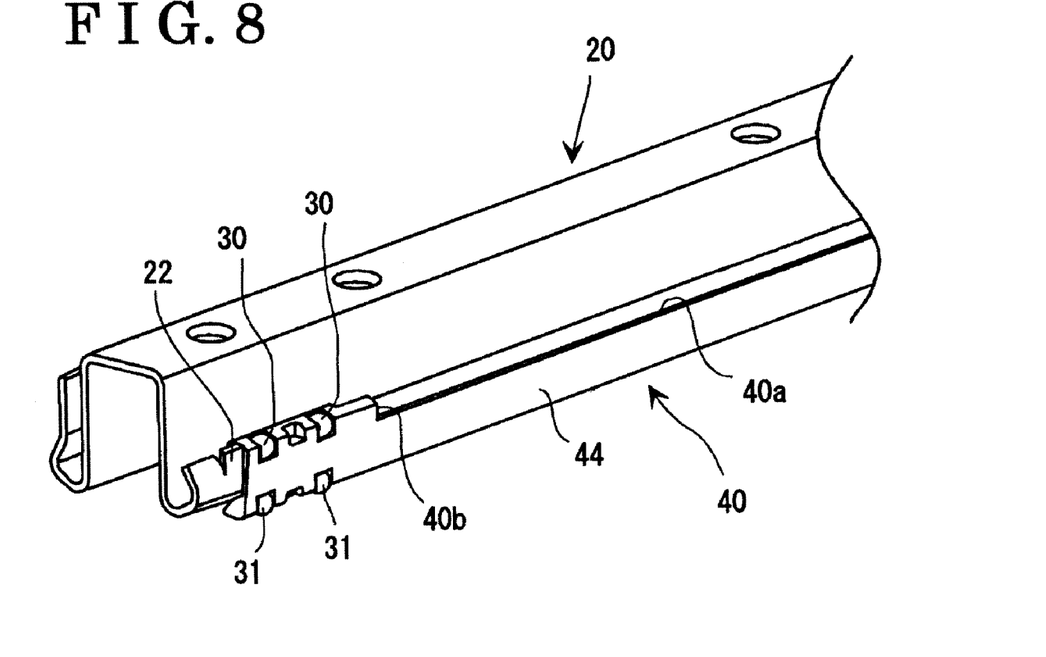
FIG. 8 is a partially enlarged perspective view of the upper rail according to the embodiment of the present invention.

The retainer 40 includes first and second thick portions 41 and 42 for holding the balls 30 and 31, respectively, and a thin portion 43 for connecting the first and second thick portions 41 and 42 with each other. Since the thin portion 43 connecting the first and second thick portions 41 and 42 with each other has a thin structure, the retainer 40 can be light-weighted as a whole. Further, as shown in FIG. 6, the rear end surface 40c of the notch 40a that makes engagement with the stopper 11 is formed at the first thick portion 41. Further, as shown in FIGS. 7 and 8, the front end surface 40b of the notch 40a is also formed at the first thick portion 41. A connection portion 44 for connecting the front end portion and the rear end portion of the retainer 40 may be entirely formed into a thin structure, or may have the same shape in cross section as that composed of the second thick portion 42 and the thin portion 43 shown in FIG. 6. As shown in FIG. 6, a portion of the lower rail 10 equipped with the retainer 45 is also formed with a stopper 12 serving as a first engagement projection for preventing the retainer 45 from projecting from the lower rail 10 in the frontward and rearward directions.

As shown in FIG. 7, a protector 21 made of resin is fitted and attached to each of the front end and the rear end of the upper rail 20. The protector 21 has, in addition to its original purpose of protecting the ends of the upper rail 20, another purpose of preventing the retainers 40 and 45 from projecting from the upper rail 20 in the frontward and rearward directions. Therefore, according to the present seat sliding apparatus for a vehicle, the post-process to prevent the retainers 40 and 45 from projecting from the upper rail 20 is not required for the upper rail 20. Alternatively, as shown in FIG. 8, a stopper 22 serving as a second engagement projection that makes engagement with the thick portion 41 of the retainer 40 may be formed at each of the front end portion and the rear end portion of the upper rail 20 by cutting and lifting thereof. The stopper 22 can be formed in the same way at a portion of the upper rail 20 equipped with the retainer 45. The stopper 22 can also prevent the retainer 40 from projecting from the upper rail 20 in the frontward and rearward directions. In FIG. 8, an illustration of the protector 21 is omitted.

According to the aforementioned embodiment, only two retainers 40 and 45 provided with the multiple balls 30 and 31, which are rotatably held at the front end portion and the rear end portion, are arranged between the one pair of the lower rail 10 and the upper rail 20. Further, only one stopper 11 is provided by a post-process at the lower rail 10 for engaging with the front and rear end surfaces 40b and 40c of the notch 40a so as to prevent the retainer 40 from protruding from the lower rail 10. Similarly, only one stopper 12 is provided by a post-process at the portion of the lower rail 10 equipped with the retainer 45. Therefore, according to the seat sliding apparatus for a vehicle of the present embodiment, the number of parts or components can be reduced and the post-process can be simplified.

According to the aforementioned embodiment, the retainers 40 and 45 are made of resin. Alternatively, the retainers 40 and 45 may be made of metal.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat sliding apparatus for a vehicle, comprising:
a lower rail fixed to a vehicle floor;
an upper rail fixed to a vehicle seat;
rolling engagement members disposed between the lower rail and the upper rail for making the upper rail to be movable relative to the lower rail in a longitudinal direction thereof;
two retainers arranged between the lower rail and the upper rail along a longitudinal direction thereof and each including a notch;
the rolling engagement members rotatably held at a front end portion and a rear end portion of the retainer; and
the lower rail including a first engagement projection engaging with front end and rear end surfaces of the notch in response to a sliding movement of the upper rail relative to the lower rail.

2. A seat sliding apparatus according to claim 1, further comprising:
a protector fitted to each of a front end and a rear end of the upper rail and engaging with the front end and the rear end of the retainer in response to the sliding movement of the upper rail relative to the lower rail.

3. A seat sliding apparatus according to claim 1, further comprising:
a second engagement projection formed at each of a front end portion and a rear end portion of the upper rail and engaging with the front end and the rear end of the retainer in response to the sliding movement of the upper rail relative to the lower rail.

4. A seat sliding apparatus according to claim 1, wherein the retainer is made of resin and includes a first thick portion holding one of the rolling engagement member and engaging with the first engagement projection, a second thick portion holding another one of the rolling engagement member, and a thin portion connecting the first and second thick portions to each other.

5. A seat sliding apparatus according to claim 2, wherein the retainer is made of resin and includes a first thick portion holding one of the rolling engagement member and engaging with the first engagement projection, a second thick portion holding another one of the rolling engagement member, and a thin portion connecting the first and second thick portions to each other.

6. A seat sliding apparatus according to claim 3, wherein the retainer is made of resin and includes a first thick portion holding one of the rolling engagement member and engaging with the first and second engagement projections, a second thick portion holding another one of the rolling engagement member, and a thin portion connecting the first and second thick portions to each other.

* * * * *